United States Patent
Banyard et al.

(10) Patent No.: US 6,392,227 B1
(45) Date of Patent: May 21, 2002

(54) LIQUID FOR PRODUCING MARKER VAPOR, A METHOD OF PRODUCING MARKER VAPOR AND A METHOD OF INSPECTION WITH MARKER VAPOR

(75) Inventors: Richard Leslie Banyard, Edmonton; Ronald Matthew Dykes, Penhold, both of (CA)

(73) Assignee: Star EnviroTech, Inc., Costa Mesa, CA (US)

( * ) Notice: Subject to any disclaimer, the term of this patent is extended or adjusted under 35 U.S.C. 154(b) by 0 days.

(21) Appl. No.: 09/385,768

(22) Filed: Aug. 30, 1999

(30) Foreign Application Priority Data

Jul. 29, 1999 (CA) ............................................. 2279147

(51) Int. Cl.$^7$ ................................................ G01M 3/20
(52) U.S. Cl. ........................... 250/302; 73/40.7; 73/40; 73/592
(58) Field of Search .......................... 250/302; 73/40.7, 73/40, 592

(56) References Cited

U.S. PATENT DOCUMENTS

| 3,683,675 A | 8/1972 | Burton, Jr. et al. ............ 73/40.7 |
| 4,155,249 A | 5/1979 | Scott ............................ 73/40.7 |
| 4,504,408 A | 3/1985 | Morton ...................... 252/301.16 |
| 4,700,657 A | 10/1987 | Butland ...................... 118/31.5 |
| 5,601,799 A | 2/1997 | Binz et al. ................... 424/1.73 |
| 5,650,563 A | 7/1997 | Cooper et al. ............... 73/40.7 |
| 5,679,553 A | 10/1997 | Van Gemen et al. ....... 435/91.2 |
| 6,170,320 B1 * | 1/2001 | Scaringe et al. .............. 73/40.7 |

FOREIGN PATENT DOCUMENTS

| CA | 1331507 | 8/1994 | ............ C09K/5/04 |
| CA | 2156231 | 2/1996 | ............ C12Q/1/68 |
| CA | 2269767 | 4/1998 | ............ C12Q/1/68 |
| WO | WO98/31752 | 7/1998 | ............ C09B/69/00 |

* cited by examiner

*Primary Examiner*—Bruce Anderson
*Assistant Examiner*—Nikita Wells
(74) *Attorney, Agent, or Firm*—Christensen O'Connor Johnson Kindness PLLC

(57) ABSTRACT

A liquid for producing a marker vapor includes a fluorescent substance in solution in a carrier liquid. The fluorescent substance has a first vaporization temperature range at which the fluorescent substance vaporizes. The carrier liquid has a second vaporization temperature range at which the carrier liquid vaporizes. The second vaporization temperature range overlaps the first vaporization range. The liquid is vaporized and directed into a body being inspected. Leaks then become visible when the body is inspected using radiation of a wavelength that causes the fluorescent substance to fluoresce.

16 Claims, 1 Drawing Sheet

LIQUID FOR PRODUCING MARKER VAPOR, A METHOD OF PRODUCING MARKER VAPOR AND A METHOD OF INSPECTION WITH MARKER VAPOR

FIELD OF THE INVENTION

The present invention relates to a liquid for producing a marker vapour, a method of producing a marker vapour with the liquid, and a method of inspection with marker vapour produced from the liquid

BACKGROUND OF THE INVENTION

U.S. Pat. No. 5,107,698 (Gilliam) discloses a smoke generating apparatus used for leak detection. What is described as a "fireproof hydraulic fluid" is splashed onto a heating element. Upon contact with the heating element the hydraulic fluid is vapourized with incomplete combustion causing smoke as a byproduct. The smoke serves as a marker vapour as it exits pin sized holes that are causing leaks. This type of marker vapour is an aerosol, as it consists of a plurality of particles dispersed in a gas.

Toxicology reports on hydraulic fluid, and the smoke produced thereby, indicate potential harm to humans. It is, therefore, preferable that a switch be made to less toxic mediums. Experiments have been made with visible vapours. Visible vapours are gaseous forms of a normally liquid or solid substances. However, it has been determined that as pressure increases the visible vapours are no longer visible. The pressure at which the visible vapours are no longer visible is in a range of 30 to 50 psi, depending upon the lighting conditions under which the visible vapour is being viewed and the exit velocity of the visible vapour.

The term "marker vapour" will hereinafter be used in its broadest sense of a substance diffused or suspended in air and will, therefore, encompass both aerosols and visible vapours.

SUMMARY OF THE INVENTION

What is required is a liquid suitable for use in producing a marker vapour, a method of producing a marker vapour with such a liquid, and a method of inspection with marker vapour produced from the liquid.

According to one aspect of the present invention there is provided a liquid for producing a marker vapour. The liquid includes a fluorescent substance in solution in a carrier liquid. The fluorescent substance has a first vapourization temperature range at which the fluorescent substance vapourizes. The carrier liquid has a second vapourization temperature range at which the carrier liquid vapourizes. The second vapourization temperature range overlaps the first vapourization range.

The liquid, as described above, produces a marker vapour that is visible at low pressure. At high pressure the marker vapour becomes visible when exposed to radiation of suitable wavelength. It is believed that there is a pressure drop as the marker vapour exits any vessel that is being checked for leaks. This pressure drop causes the marker vapour to experience a change in state from vapour to liquid, thereby depositing a fluorescent marker at the exit point. This enables anomalies or defects resulting in leakage to be clearly discernable upon inspection under radiation of suitable wavelength.

Once the concept of a vapour that contained a fluorescent marker was conceived, difficulties were experienced in putting the theory into practice. A number of fluorescent marker liquids existed that were used for non-aerosol applications. They consisted of a fluorescent substance in solution in a solvent based or water based carrier liquid. These existing fluorescent marker liquids proved not to be suitable for aerosol application, as the application of heat tended to separate their constituents. When a solvent based fluorescent marker liquid was exposed to vapourizing heat, the solvent tended to flash off, leaving the fluorescent substance behind. When a water based fluorescent marker liquid was exposed to vapourizing heat, the water tended to evaporate, leaving the fluorescent substance behind. Success was achieved by matching a fluorescent substance with a carrier fluid that had overlapping vapourization temperatures.

Although beneficial results were obtained through the use of the liquid for producing a marker vapour, as described above, it was discovered that the most effective vapourization temperature ranges for the carrier liquid frequently resulted in inefficient vapourization or even burning of the fluorescent substance, or vice visa. The fluorescent substance has a first critical point at which the liquid and vapour phases of the fluorescent substance are in equilibrium. The carrier liquid has a second critical point at which the liquid and vapour phases of the carrier liquid are at equilibrium. Even more beneficial results were obtained when the first critical point and the second critical point were substantially the same. This enabled a balancing of vapourization temperatures to be performed to efficiently vapourize both the fluorescent substance and the carrier liquid, without concern that accidental temperature fluctuations will result in combustion of one of the fluorescent substance or the carrier liquid. The process can be controlled to at all times maintain the temperature in the more efficient vapourization ranges and well below the combustion temperatures.

Although beneficial results may be obtained through the use of the liquid for producing marker vapour, as described above, it is preferred that the marker vapour be not only less harmful, but completely harmless. Even more beneficial results may, therefore, be obtained when both the fluorescent substance and the carrier liquid are non-toxic. There are a variety of non-toxic food grade oils that are suitable for use. There are also a variety of non-toxic fluorescent substances presently used in medical applications that are suitable.

After a series of unsuccessful experiments using water and various solvents as carrier liquids, beneficial results were first obtained using a non-toxic mineral oil and also using glycerine. It will be appreciated that it should be possible to use a variety of carrier liquids, including water or solvent. The key to developing such liquid for producing marker vapour lies in finding a fluorescent substance that has a similar vapourization temperature range as water or the particular solvent selected.

According to another aspect of the present invention there is provided a method of producing a marker vapour which includes the steps of providing a fluorescent marker liquid as described above and vapourizing the fluorescent marker liquid at a temperature that is within both the first vapourization temperature range and the second vapourization temperature range. This forms a vapour that is visible at low pressure, and becomes visible at high pressure when exposed to radiation of suitable wavelength.

Although beneficial results may be obtained through the use of the method, as described above, of the various ways of vapourization, the best results were obtained when the fluorescent marker liquid was vapourized by atomizing the fluorescent marker liquid onto a heated substrate.

According to another aspect of the present invention there is provided a method of inspection with marker vapour which includes the following described steps. A first step involves providing a fluorescent marker liquid consisting of a carrier liquid containing a fluorescent substance. A second step involves vapourizing the marker liquid to produce a vapour. A third step involves directing the vapour into a pressure container being inspected. A fourth step involves inspecting the pressure container under radiation of suitable wavelength to cause the fluorescent substance to fluoresce.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
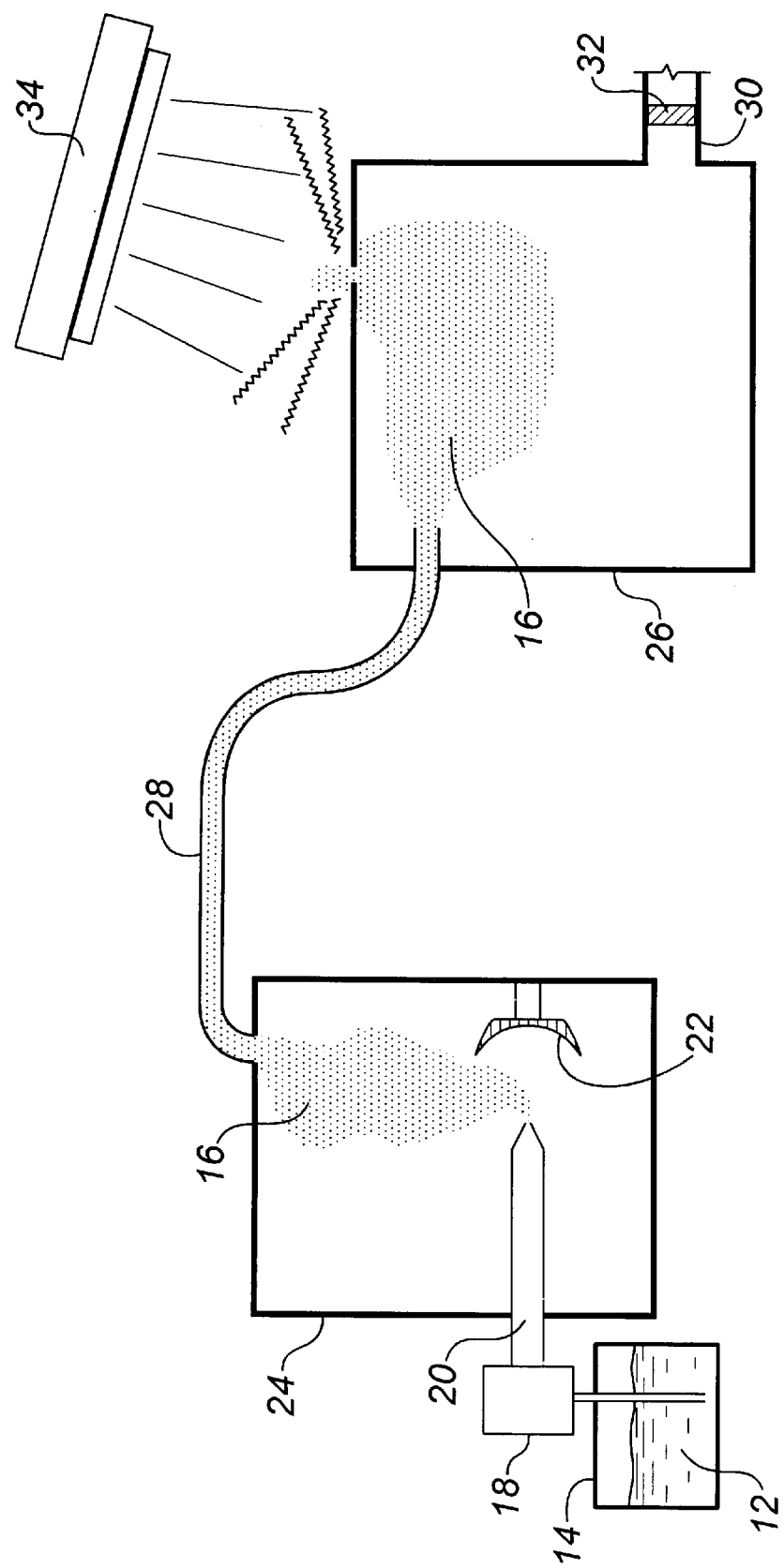
FIG. 1 is a side elevation view, in section, illustrating a preferred method of producing marker vapour from the preferred liquid for producing marker vapour and the preferred method of using the marker vapour for purposes of inspection.

A preferred method of inspection with marker vapour will now be described with reference to FIG. 1.

The method involves the following steps. A first step involves providing a fluorescent marker liquid 12 containing a fluorescent substance. Liquid 12 is shown in a liquid reservoir 14. A second step involves vapourizing liquid 12 to produce a vapour 16. Liquid 12 is shown being pumped by a feed pump 18 through an atomizing spray nozzle 20 onto a concave heated dish 22. Upon contact with heated dish 22 liquid 12 is vapourized. A canister 24 is provided to contain vapour 16. A third step involves directing vapour 16 into a pressure container 26 being inspected. A conduit 28 is illustrated for conveying vapour 16 from canister 24 to pressure container 26. Outlets 30 in body 26 are blocked with removable plugs 32 so that vapours 16 are unable to freely pass through. A fourth step involves inspecting body 26 under radiation of suitable wavelength to cause the fluorescent substance to fluoresce. The radiation source illustrated is a black light 34. There is a pressure drop as the marker vapour exits any body 26 through a leaks. This pressure drop causes vapour 16 to experience a change in state from vapour to liquid, thereby depositing a fluorescent marker at the exit point. This enables anomalies or defects resulting in leakage to be clearly discernable upon inspection under black light 34. Pressure container can first be inspected at low pressure and then the pressure gradually increased while inspection under radiation from black light 34 continues. There are some inspection pressures specified in government regulations or manufacturer's specifications.

In developing this method of inspection two problems were encountered. Firstly, a liquid for producing a marker vapour containing fluorescent marker had to be developed. Secondly, a method of vapourizing the liquid to obtain the best results had to be developed. The liquid developed includes a fluorescent substance in solution in a carrier liquid. The fluorescent substance has a first vapourization temperature range at which the fluorescent substance vapourizes. The carrier liquid has a second vapourization temperature range at which the carrier liquid vapourizes. The second vapourization temperature range overlaps the first vapourization range.

It is preferred that vapour 16 be completely harmless to humans. There are a variety of non-toxic oils that are suitable for use as a carrier liquid. A source of such non-toxic carrier oils is Ostrem Chemicals Inc. There are also a variety of non-toxic fluorescent substances that are suitable. A source of such non-toxic fluorescent substances is Angstrom Technologies Inc. The fluorescent substances of Angstrom Technologies Inc. come in powder form and must be mixed gradually with the carrier liquid. Although a carrier oil is described, beneficial results are also obtainable with other carrier liquids, such as glycerine.

It must be appreciated that the fluorescent substance has a first critical point at which the liquid and vapour phases of the fluorescent substance are in equilibrium. The carrier liquid has a second critical point at which the liquid and vapour phases of the carrier liquid are at equilibrium. The initial batches of carrier liquid and fluorescent substances had a narrow area of overlap between the first vapourization temperature range and the second vapourization temperature range. This proved the concept, but made it difficult to optimize the process. The fluorescent substance used had a vapourization temperature range of 350 degrees Fahrenheit to 400 degrees Fahrenheit. At temperatures above 400 degrees Fahrenheit it started to burn. In contrast the carrier liquid had a vapourization temperature range of 350 degrees to over 500 degrees Fahrenheit. It was discovered that an optimum vapourization temperature for the carrier liquid was 450 degrees Fahrenheit, but at that temperature the fluorescent substance was being burned. It is, therefore, preferred that the fluorescent substance and the carrier liquid be selected so that the first critical point and the second critical point are substantially the same. This enables a balancing of vapourization temperatures to be performed, without concern that temperature fluctuations will result in inefficient vapourization or combustion of either the fluorescent substance or the carrier liquid. The process can be controlled to at all times maintain the temperature below the combustion temperature.

Once a suitable fluorescent marker liquid was developed, a method had to be developed for producing a marker vapour form the liquid. It was determined that the method used in the Gilliam reference was not effective. It was felt that the cause of the problem was that too much liquid was being delivered to the heating element at once. The best results were obtained when the fluorescent marker liquid was vapourized by atomizing the fluorescent marker liquid through atomizing nozzle 20 onto a heated substrate, such as concave dish 22.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A liquid for producing a marker vapour, comprising:
   a fluorescent substance in solution in a carrier liquid, the fluorescent substance having a first vapourization temperature range at which the fluorescent substance vapourizes and the carrier liquid having a second vapourization temperature range at which the carrier liquid vapourizes and the second vapourization temperature range overlapping the first vapourization range.

2. The liquid for producing a marker vapour as defined in claim 1, wherein the fluorescent substance has a first critical point at which the liquid and vapour phases of the fluorescent substance are in equilibrium, and the carrier liquid has a second critical point at which the liquid and vapour phases of the carrier liquid are at equilibrium, the first critical point and the second critical point being substantially the same.

3. The liquid for producing a marker vapour as defined in claim 1, wherein the fluorescent substance and the carrier liquid are non-toxic.

4. The liquid for producing a marker vapour as defined in claim 1, wherein the carrier liquid is one of oil and glycerine.

5. A method of producing a marker vapour, comprising the steps of:

provinding a fluorescent marker liquid consisting of a fluorescent substance in solution in a carrier liquid, the fluorescent substance having a first vapourization temperature range at which the fluorescent substance vapourizes and the carrier liquid having a second vapourization temperature range at which the carrier liquid vapourizes, the second vapourization temperature range overlapping the first vapourization range; and vapourizing the fluorescent marker liquid at a temperature that is within both the first vapourization temperature range and the second vapourization temperature range, thereby forming a vapour that is visible when exposed to radiation of suitable wavelength.

6. The method as defined in claim 5, wherein the fluorescent substance has a first critical point at which the liquid and vapour phases of the fluorescent substance are in equilibrium, and the carrier liquid has a second critical point at which the liquid and vapour phases of the carrier liquid are at equilibrium, the first critical point and the second critical point being substantially the same.

7. The method as defined in claim 5, the fluorescent marker liquid being vapourized by application onto a heated substrate.

8. The method as defined in claim 7, the application of the fluorescent marker liquid onto the heated substrate being by atomizing through an atomizing nozzle.

9. The method as defined in claim 7, the heated substrate being a concave surface.

10. A method of inspection with marker vapour, comprising the steps of:

providing a fluorescent marker liquid consisting of a carrier liquid containing a fluorescent substance;

vapourizing the marker liquid to produce a marker vapour;

directing the marker vapour into a pressure container being inspected for pressure leaks;

inspecting an exterior of the pressure container under radiation of suitable wavelength to cause the fluorescent substance to fluoresce.

11. The method as defined in claim 10, including the further step of gradually increasing pressure in the container while continuing to inspect the pressure container under radiation of suitable wavelength.

12. The method as defined in claim 10, the marker liquid consisting of a fluorescent substance in solution in a carrier liquid, the fluorescent substance having a first vapourization temperature range at which the fluorescent substance vapourizes and the carrier liquid having a second vapourization temperature range at which the carrier liquid vapourizes and the second vapourization temperature range overlapping the first vapourization range.

13. The method as defined in claim 12, wherein the fluorescent substance has a first critical point at which the liquid and vapour phases of the fluorescent substance are in equilibrium, and the carrier liquid has a second critical point at which the liquid and vapour phases of the carrier liquid are at equilibrium, the first critical point and the second critical point being substantially the same.

14. The method as defined in claim 10, the fluorescent marker liquid being vapourized by application onto a heated substrate.

15. The method as defined in claim 14, the application of the fluorescent marker liquid onto the heated substrate being by atomizing through an atomizing nozzle.

16. The method as defined in claim 14, the heated substrate being a concave surface.

* * * * *

(12) EX PARTE REEXAMINATION CERTIFICATE (8822nd)
United States Patent
Banyard et al.

(10) Number: US 6,392,227 C1
(45) Certificate Issued: Jan. 24, 2012

(54) LIQUID FOR PRODUCING MARKER VAPOR, A METHOD OF PRODUCING MARKER VAPOR AND A METHOD OF INSPECTION WITH MARKER VAPOR

(75) Inventors: Richard Leslie Banyard, Edmonton, CA (US); Rondald Matthew Dykes, Penhold, CA (US)

(73) Assignee: Star Envirotech, Inc., Costa Mesa, CA (US)

Reexamination Request:
No. 90/011,544, Mar. 7, 2011

Reexamination Certificate for:
Patent No.: 6,392,227
Issued: May 21, 2002
Appl. No.: 09/385,768
Filed: Aug. 30, 1999

(51) Int. Cl.
*G01M 3/00* (2006.01)
*G01M 3/20* (2006.01)
*G01M 3/38* (2006.01)

(52) U.S. Cl. .............................. 250/302; 73/40; 73/40.7; 73/592

(58) Field of Classification Search ................... 250/302
See application file for complete search history.

(56) References Cited

To view the complete listing of prior art documents cited during the proceeding for Reexamination Control Number 90/011,544, please refer to the USPTO's public Patent Application Information Retrieval (PAIR) system under the Display References tab.

*Primary Examiner* — Alan Diamond

(57) ABSTRACT

A liquid for producing a marker vapor includes a fluorescent substance in solution in a carrier liquid. The fluorescent substance has a first vaporization temperature range at which the fluorescent substance vaporizes. The carrier liquid has a second vaporization temperature range at which the carrier liquid vaporizes. The second vaporization temperature range overlaps the first vaporization range. The liquid is vaporized and directed into a body being inspected. Leaks then become visible when the body is inspected using radiation of a wavelength that causes the fluorescent substance to fluoresce.

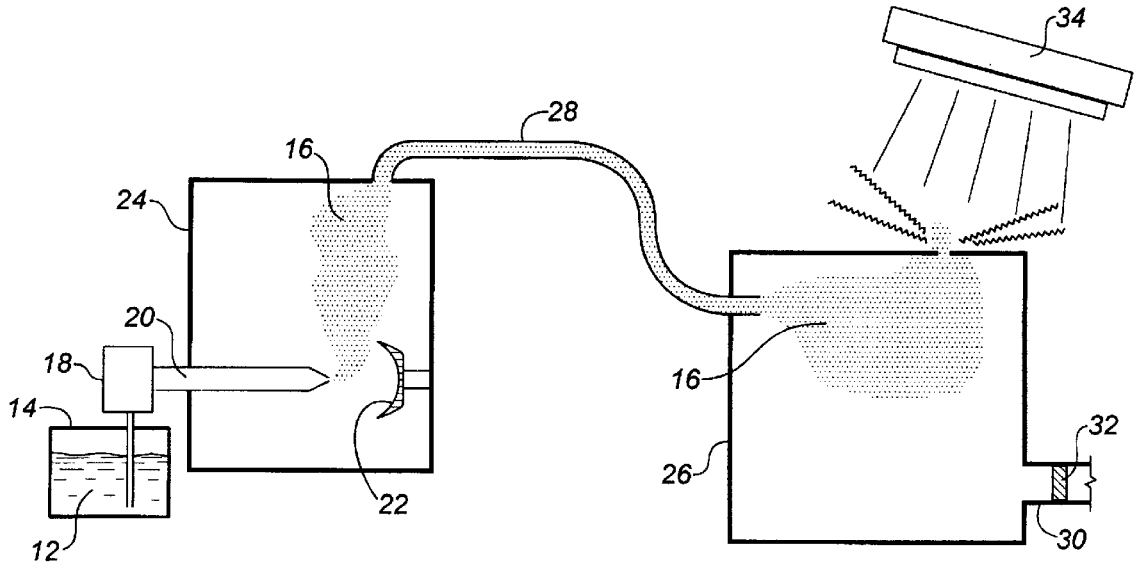

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 4 is cancelled.

Claims 1, 5 and 10 are determined to be patentable as amended.

Claims 2, 3, 6-9 and 11-16, dependent on an amended claim, are determined to be patentable.

New claims 17 and 18 are added and determined to be patentable.

1. A liquid for producing a marker vapour, comprising:
   a fluorescent substance in solution in a carrier liquid, *wherein the carrier liquid is one of oil and glycerin,* the fluorescent substance having a first vapourization temperature range at which the fluorescent substance vapourizes and the carrier liquid having a second vapourization temperature range at which the carrier liquid vapourizes and the second vapourization temperature range overlapping the first vapourization range.

5. A method of producing a marker vapour *and for detecting a leak in a container,* comprising the steps of:
   providing a fluorescent marker liquid consisting of a fluorescent substance in solution in a carrier liquid, the fluorescent substance having a first vapourization temperature range at which the fluorescent substance vapourizes and the carrier liquid having a second vapourization temperature range at which the carrier liquid vapourizes, the second vapourization temperature range overlapping the first vapourization range; [and]
   vapourizing the fluorescent marker liquid at a temperature that is within both the first vapourization temperature range and the second vapourization temperature range, thereby forming a vapour [that is visible when exposed to radiation of suitable wavelength] *;*
   *directing the vapour under pressure into the container so that the vapour exits the leak therein whereby at least some of the vapour changes back to a liquid for depositing the fluorescent substance at the site of the leak; and*
   *inspecting the exterior of the container under radiation of suitable wavelength to cause the fluorescent substance deposited by the liquid to fluoresce and thereby indicate the location of the leak.*

10. A method of inspection with marker vapour, comprising the steps of:
    providing a fluorescent marker liquid consisting of a carrier liquid containing a fluorescent substance;
    vapourizing the marker liquid to produce a marker vapour;
    directing the marker vapour *under pressure* into a pressure container being inspected for pressure leaks *such that the marker vapour exits a leak whereby at least some of the vapour changes back to a liquid for depositing the fluorescent substance at the site of the leak*; and
    inspecting an exterior of the pressure container under radiation of suitable wavelength to cause the fluorescent substance *deposited by the liquid* to fluoresce *and thereby indicate the location of the leak.*

*17. The method as defined in claim 5, wherein the fluorescent marker liquid is one of oil, glycerin and a solvent.*

*18. The method as defined in claim 10, wherein the fluorescent marker liquid is one of oil, glycerin and a solvent.*

* * * * *